United States Patent [19]

Laskowski

[11] Patent Number: 4,788,441
[45] Date of Patent: Nov. 29, 1988

[54] RANGE FINDER WHEREIN DISTANCE BETWEEN TARGET AND SOURCE IS DETERMINED BY MEASURING SCAN TIME ACROSS A RETROREFLECTIVE TARGET

[75] Inventor: Edward L. Laskowski, Seven Hills, Ohio

[73] Assignee: Acme-Cleveland Corporation, Mentor, Ohio

[21] Appl. No.: 98,408

[22] Filed: Sep. 17, 1987

Related U.S. Application Data

[63] Continuation-in-part of Ser. No. 809,119, Dec. 16, 1985, abandoned.

[51] Int. Cl.⁴ .................. G01N 21/86; G01V 9/04
[52] U.S. Cl. .......................................... 280/561; 356/4
[58] Field of Search ............... 250/201 R, 561; 356/1, 356/4, 5, 141, 152

[56] References Cited

U.S. PATENT DOCUMENTS

| | | | |
|---|---|---|---|
| 3,324,383 | 6/1967 | Chu | 322/73 |
| 3,434,785 | 3/1969 | Weber | 356/4 |
| 3,530,468 | 9/1970 | Hannan | 356/4 |
| 3,749,500 | 7/1973 | Carlson et al. | 356/156 |
| 4,025,193 | 5/1977 | Pond et al. | 356/5 |
| 4,029,415 | 6/1977 | Johnson | 356/4 |
| 4,119,379 | 10/1978 | Zindler | 356/4 |
| 4,184,767 | 1/1980 | Hughes et al. | 356/152 |
| 4,192,612 | 3/1980 | Bodlaj | 356/381 |
| 4,212,534 | 7/1980 | Bodlaj | 356/1 |
| 4,225,226 | 9/1980 | Davidson | 356/1 |
| 4,239,388 | 12/1980 | Green | 356/5 |
| 4,268,167 | 5/1981 | Alderman | 356/1 |
| 4,325,638 | 4/1982 | Takeda et al. | 356/375 |
| 4,336,997 | 6/1982 | Ross et al. | 356/4 |
| 4,417,816 | 11/1983 | Kindl et al. | 356/357 |
| 4,441,809 | 4/1984 | Dudley et al. | 356/1 |
| 4,443,078 | 4/1984 | Niwa et al. | 354/403 |
| 4,453,085 | 6/1984 | Pryor | 250/561 |
| 4,518,254 | 5/1985 | Penny et al. | 356/5 |
| 4,560,270 | 12/1985 | Wiklund et al. | 356/5 |
| 4,595,294 | 6/1986 | Ohki et al. | 356/375 |

FOREIGN PATENT DOCUMENTS 2186658 11/1974 France .
2495797 11/1982 France .
2143395 6/1985 United Kingdom .

OTHER PUBLICATIONS

Patents Abstracts of Japan, vol. 8, No. 215 (P-305) [1652], Oct. 2, 1984; & JP-A-59 99 308 (Komatsu Seisakusho K. K.) 08-06-1984.
Lasernet, The Smart Sensor SD/LN1 10M/4-86.

*Primary Examiner*—David C. Nelms
*Assistant Examiner*—William L. Oen
*Attorney, Agent, or Firm*—Pearne, Gordon, McCoy & Granger

[57] ABSTRACT

A target has leading and trailing edges which are boundaries between a retroreflector and a non-retroreflector. The target is used in target determining apparatus for distance, width, azimuth, gauging, profiling, object detection, and particular target identification. A laser light source scans along a scanning path across the target. The retroreflector reflects light back toward the scanning means where it is received in a photoreceptor to determine the angles of the target edges. The distance to the target and the width are inversely proportional to the length of time that the light beam scans across the target. The laser light also scans across a reference point and the length of time between this reference point and the reflection from the target is directly proportional to the azimuthal position of the target relative to the reference. Further, the target may include a plurality of reflective and non-reflective strips transverse to the scanning path to establish binary indicia on the target. This results in a series of pulses from the photoreceptor as the beam scans the width of the target. This information is then decoded to determine the binary indicia and hence identify that particular target. The foregoing abstract is merely a resume of one general application, is not a complete discussion of all principles of operation or applications, and is not to be construed as a limitation on the scope of the claimed subject matter.

30 Claims, 14 Drawing Sheets

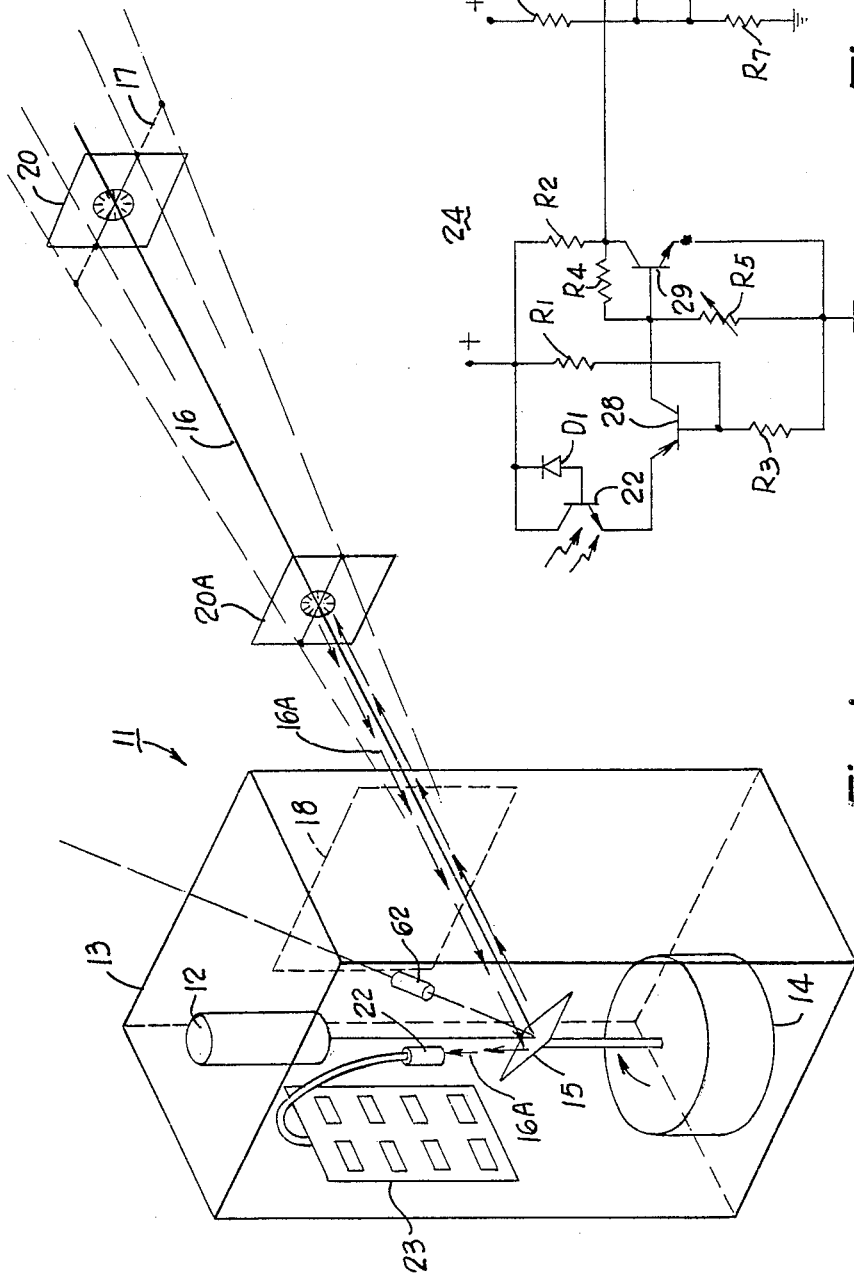
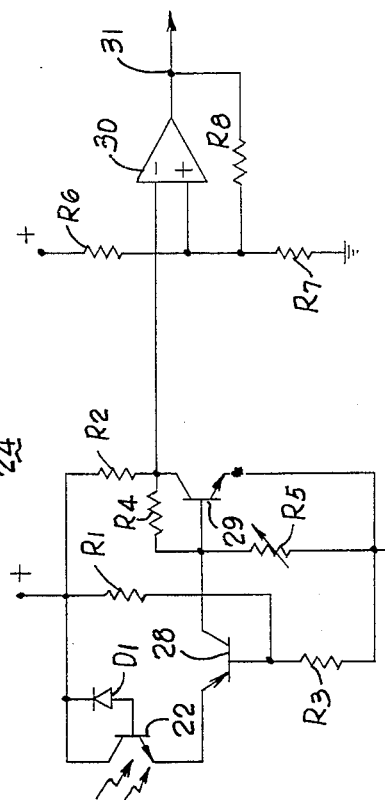
Fig. 1
Fig. 2

RANGE FINDER WHEREIN DISTANCE BETWEEN TARGET AND SOURCE IS DETERMINED BY MEASURING SCAN TIME ACROSS A RETROREFLECTIVE TARGET

This application is a continuation-in-part of my application Ser. No. 809,119, filed Dec. 16, 1985 abandoned.

BACKGROUND OF THE INVENTION

Position or target determining apparatus has previously been proposed, for example, in U.S. Pat. No. 4,225,226, which teaches the use of a scanning laser that interrogates retroreflectors positioned along one side of a field at fixed distances apart. A triangulation technique is used to determine both range and azimuth information. U.S. Pat. No. 4,029,415 teaches the use of a laser scanning a fixed width array of photodetectors, and a triangulation technique is utilized to determine range or distance information. U.S. Pat. No. 4,239,388 teaches use of a laser and an associated reflected laser light detector for identifying a laser light reflecting object by its pattern of reflectivity as a function of time. Furthermore, U.S. Pat. No. 4,307,791 determines position on a factory floor by scanning a pickup mirror over a strip of fluorescent dye. U.S. Pat. No. 4,647,784 teaches another version of triangulation using multiple targets for the control of a vehicle, of which the targets have an embedded identification code.

The first-mentioned patent has the objective of informing a crop dusting airplane pilot of his position over the field to be dusted so that evenly spaced passes may be obtained. It requires complicated electronics including a microprocessor to establish the position for subsequent passes over the field. The second-mentioned patent has for its object the surveying of land but requires an operator to move the rod on which the fixed width array of photodetectors is mounted. The third-mentioned patent has for its object the determination of objects on the ground by an aircraft or the like flying overhead and directing a laser beam downward to be reflected from the ground or the object. The fourth-mentioned patent relies on multiple signal components from the fluorescent strip on the floor for analysis of position, and the fifth-mentioned patent uses multiple bar coded targets without a means for handling distance effects on bar code timing.

SUMMARY OF THE INVENTION

The problem to be solved, therefore, is how to achieve a target determining apparatus which is automatic in its operation and may be unattended and which will determine any one or all of distance, azimuth or binary identification indicia from a target.

The problem is solved by a target determining apparatus comprising, in combination, a light source at a first location, means at said first location for scanning a beam from said light source along a scanning path at a known rate of angular velocity, a retroreflector and a non-retroreflector adapted to be at a second location in said scanning path to reflect said light beam from said retroreflector back toward said scanning means, one of said retroreflector and said non-retroreflector being a target having leading and trailing edges, said light source beam being narrow in the direction of said scanning path and narrower than the scanned with of said target, one of the target scan width and target distance being known, a photoreceptor positioned at said first location to be responsive to any reflected light beam from said retroreflector, and target determining means to determine the other of said target scan width and distance with distance related inversely, and the target scan width related directly, to the length of time between the light beam scan from the target leading edge across the target to the trailing edge.

The problem may further be solved by a target determining apparatus comprising, in combination, a light source, means for scanning a beam from said light source along a scanning path, a target mounted on an object adapted to be in said scanning path to reflect said light beam back toward said scanning means, a photoreceptor positioned to be responsive to any reflected light beam from said target reflector, a plurality of retroreflective and non-reflective strips transverse to said scanning path constituting said target to establish binary indicia on said target, means connected to said photoreceptor to read the binary indicia on said target, and means to compensate for differing effective scan times of said strip in accordance with variations in distance to said target.

The problem may further be solved by a target determining apparatus comprising, in combination, a light source at a first location, means at said first location for scanning a beam from said light source along a scanning path at a known rate of angular velocity, a retroreflector and a non-retroreflector adapted to be at a second location in said scanning path to reflect said light beam from said retroreflector back toward said scanning means, said non-retroreflector being a target having leading and trailing edges, said light source beam being narrow in the direction of said scanning path and narrower than the scanned width of said target, a photoreceptor positioned at said first location to be responsive to any reflected light beam from said retroreflector, and target determining means to determine the presence of a target in the scan of said light beam including means to measure the angle between the light beam scan from the target leading edge across the target to the trailing edge.

Furthermore, other variations of the problem are solved by using complementary forms of the solution, such as using a shadow of known width located somewhere in the full scan field of a continuous retroreflector and then determining distance per the inverse time algorithm as described for the above case, determining width of the shadow knowing the distance to the target, or determining the presence of an object by scanning across the width of the target.

Accordingly, an object of the invention is to provide a target determining apparatus wherein the target has leading and trailing edges which are boundaries between a retroreflector and a non-retroreflector. The retroreflector is scanned by a light beam to obtain the position of the target or an absent retroreflector segment is scanned by a light beam to obtain the position of the shadow.

Another object of the invention is to provide a target determining apparatus wherein a light beam scans a retroreflector of known width at a known scanning rate to determine any one or all of distance, azimuth or binary indicia for single, or independent multiple targets.

Other objects and a fuller understanding of the invention may be had by referring to the following description and claims, taken in conjunction with the accompanying drawing.

BRIEF DESCRIPTION OF THE DRAWINGS

FIG. 1 is an isometric drawing of a target determining apparatus incorporating the invention;

FIG. 2 is a schematic diagram of an optical receiver circuit;

DESCRIPTION OF THE PREFERRED EMBODIMENTS

Figure 3:
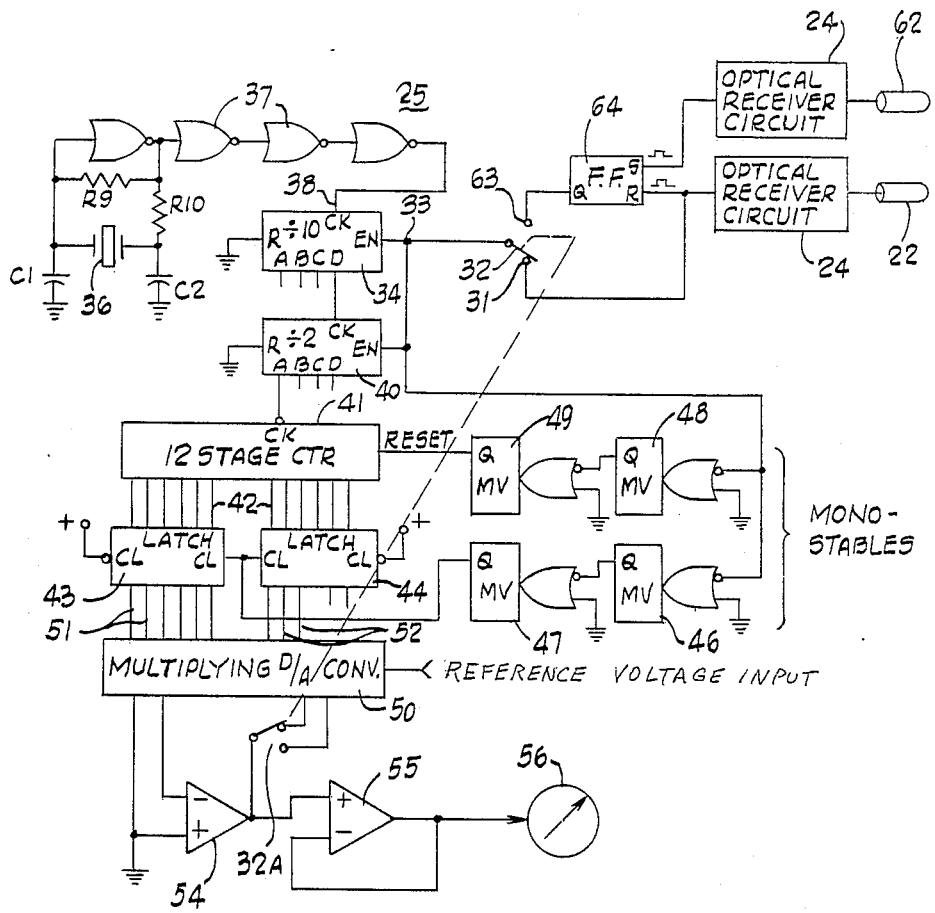
FIG. 3 is a schematic diagram of a pulse width to voltage conversion circuit.

The drawing illustrates a target determining apparatus 11 which embodies the present invention. This apparatus 11 includes a light source 12 which is preferably of columnated light such as a laser. This laser may be mounted inside a housing 13 for protection of the components. A rotatable motor 14 and a mirror 15 provides a means to scan a light beam from this light source 12 along a scanning path 16 at a known rate of angular velocity. In the present embodiment, this scanning path is in a horizontal plane because of a vertical motor axis and the 45-degree angle disposition of the mirror. This mirror is preferably a front surface mirror so that the scanning beam is narrow in the direction of the scanning path 17. In the preferred embodiment, this scanning path extends radially from the rotatable mirror 15. A part or all of the housing 13 has a transparent window 18 so that the light beam may scan all or part of a 360-degree scanning path 17.

A target 20 has leading and trailing edges, relative to the light beam scan, which are boundaries between a retroreflector and a non-retroreflector. In this case, the target is a retroreflector of a known size, is adapted to be mounted on an object 21, as in FIG. 5, and is adapted to be mounted in the scanning path to reflect the beam of light from the light source 12 back toward the scanning mirror 15. A first photoreceptor 22 is positioned to be responsive to any reflected light beam 16 from the target reflector and, as FIG. 1 shows, this photoreceptor is positioned closely adjacent the light source 12. The target retroreflector is a device with the characteristic to return an incident light beam along it original axis, independent of axial incidence to the plane of the reflector. In practice, the returned beam of light 16A is somewhat dispersed, and is not quite as columnated as the incident beam 16. The returned beam of light 16A instantaneously impinges the same rotating mirror 15, and reflects the returned beam back to the light source 12. However, since this returned beam is less columnated than the original, it can impinge a photoreceptor 22, which in practical terms is close to, but not coincident with, the output beam of light source 12. An electronic circuit 23 is connected to the receptor 22 to determine the position of the target or information about the target.

The motor 14 rotates the mirror 15 at a constant angular velocity. This may be anything practicable for the intended use and 20 revolutions per second is an example of the appropriate rate of scan.

A first use for this target determining apparatus 11 is to determine the distance to the target 20. FIG. 1 shows this target at a first distance from the scanning mirror and also shows the mirror at a second position 20A positioned closer to the scanning mirror. If one used a four-inch wide retroreflector target 20 and it was positioned at ten feet distance, this might take five milliseconds to scan from the leading to the trailing edges of this target. However, if the same width target is positioned at 20A at one-half the distance or five feet distance from the mirror, then at the same rate of scan it will take ten milliseconds to scan from the leading to the trailing edge of this target. This is in accordance with the proportionality of:

angle α(width/distance).

The apparatus permits one to determine the distance to a target by the length of time for scanning across the target and it will be noted that the distance to the target is inversely related to the length of time of scan across the target. The electronic circuit 23 or software is capable of calculating this distance to the target. Conversely, if the target distance is known, the target scan width may be determined.

FIG. 2 illustrates an optical receiver circuit 24, and FIG. 3 illustrates a pulse width to voltage circuit 25 which together make up the circuit 23. In FIG. 2, the photoreceptor 22 is shown as a phototransistor, with the signal being amplified by transistors 28 and 29 and then fed to an operational amplifier 30 which is connected as a comparator to obtain a square pulse output at the terminal 31. This pulse is applied at the terminal 31 of a range switch 32 in the pulse width to voltage circuit 25 of FIG. 3. With this range switch in the position shown, the input pulse is applied to an enable terminal 33 of a divider 34. A high frequency oscillator 35, for example, four megahertz, is controlled by a crystal 36, and this signal is fed through a series of inverter gates 37 to square the oscillator signal and then is supplied to a clock input 38 of the divider 34. The enable input and clock input 38 form an AND circuit with output from the divider being produced only when the enable and clock inputs are a logic high. The output from the divider 34 is passed to a second divider 40 to obtain a lower frequency, 200 kilohertz as an example. This lower clock frequency is supplied to the clock input of a counter 41, for example, a 12-stage counter with the output being on a plurality of lines 42 and appearing as a binary number. This plural lines are connected to latches 43 and 44 which hold the last count from the counter 41.

The pulse signal at terminal 33 is also applied through monostable multivibrators 46 and 47 to obtain a short pulse, for example, 100 microseconds, which is applied to the clock terminals of the latches 43 and 44 and hence clocks the information of the latches into a digital-to-analog conversion unit 50. At the same time, the pulse on the photoreceptor 22 acts through monostable multivibrators 48 and 49 in series to reset the counter 41. The signal from the latch 43 is on plural lines 51 and is the most significant bit of a binary number, whereas the signal from the latch 44 is on plural lines 52 and is the least significant bit presented to the D/A converter 50. The output of the D/A converter 50 is an analog voltage amplified by amplifier 54 and is then passed to a unity gain voltage follower 55 and then to a meter such as a volt meter 56.

In operation, the electronic circuit 23 operates to determine range or distance to the target by determining the length of time between the light beam reflection from the leading and trailing edges of the reflector 20. As an example of one possible application, let it be assumed that the oscillator is operating at four megahertz, the output from the divider 40 is 200 kilohertz, and the length of scan from the leading to trailing edges of this target reflector is five milliseconds at a 10-foot distance of the target. When the light source is reflected from the target 20, the phototransistor 22 in FIG. 2 will be illuminated to turn on this transistor and this turns on transistors 28 and 29. This drives the inverting input to the op amp 30 low turning on this op amp so that the output terminal 31 is logic high. This logic high is transferred to FIG. 3 and applied to the enable terminal 33 of a divider 34. The terminals 33 and 38 of this divider 34 form an AND circuit so that during the time that light is reflected from the target 20, the pulses from the oscillator 35 will be supplied as an input to the dividers 34 and 40. With the above-mentioned example, this would be 1000 pulses of the 200 kilohertz clock frequency applied to the counter 41 during this 5-millisecond scan across the width of the target 20. These 1000 pulses will be transformed to a binary number and applied to the digital-to-analog converter. The binary equivalent of the decimal number 1000 will then be applied at the output of the converter to the input of the amplifier 54. Assume that this is 2 volts, merely as an example. The amplifier 54, in conjunction with D/A converter 50, inverts so that the output has a one-half volt output. The amplifier 55 operates as a unity gain voltage follower so that one-half volt is applied to the volt meter 56. This meter could be calibrated to show distance in feet, e.g., 10 feet for a one-half volt input.

If now the target is moved to the position 20A at a distance of only five feet from the mirror 15, then the target will appear to be twice as wide, and it will take 10 milliseconds to scan across the width of this target. During this 10 milliseconds of scan width, there will be 2000 pulses applied to the counter 41 and hence the output of the converter 50 will be four volts instead of two volts. Since the amplifier 54 is connected to a multiplying D/A converter 50 in such a way that an increase in the value of the binary input signal to the D/A gives a decrease in the output of amplifier 54 according to the "1 divided by X" relationship, the output will be one-fourth of a volt applied to the meter 56 instead of one-half volt. Hence, the meter reading, when calibrated in feet, would be only five feet instead of 10 feet. Thus, the apparatus 11 determines the range or distance to the target, and this distance is inversely related to the length of time of the scan of the width of the target. The circuits of FIGS. 2 and 3 each demonstrate one embodiment of a functional operation. Other, more or less elaborate circuits can be designed to perform the functions of providing a digital signal representing the status of returned light, as is done in FIG. 2, and pulse width conversion to an analog voltage, as is done in FIG. 3. Indeed, an integrated optoelectronic switch, the Sprague ULN-3330, can be substituted for the circuit in FIG. 2. In some applications the D/A converter 50 would not be used, and the digital count, contained in the 12-stage counter 41, can be brought out directly to provide total digital representation of range to an intelligent control device, such as a microprocessor-based control system. The function of the D/A converter 50 that is perform the mathematical inverse operation to make the output signal proportional with distance can, in this case, be computed internally within the microprocessor control through a software implementation of the inverse calculation.

The target determining apparatus 11 may also be utilized to determine the azimuthal position of the target relative to a known azimuthal reference. FIG. 1 shows a second photoreceptor 62 at a known azimuth and located within the instrument housing, e.g., at the edge of the window 18, and this may be considered a reference zero degrees. The motor 14 may rotote in either direction and is shown as rotating clockwise with the target at about a 45-degree angle relative to this reference zero position. To determine the azimuth, the circuit of FIG. 3 may be utilized. The range switch 32 may be switched upwardly to an azimuth terminal 63 which is driven from the Q output of a flip-flop 64 to which the first and second photoreceptors 22 and 62 are each connected through an optical receiver circuit like that in FIG. 2, to the R and S inputs, respectively. Simultaneously, a second set of switch contacts 32A switch the D/A converter from an inversion function (1 divided by X) to a linear function. The length of time that the laser beam sweeps from the reference position to the beginning of scan of the retroreflector is proportional to the azimuthal position of this target. When the light beam scans the second photoreceptor 62, a pulse is emitted and this causes the flip-flop 64 to switch to emit a logic high from the Q output. Accordingly, clock pulses are counted by the counter 41 until the beam sweeps past the target retroreflector 20. This causes an input at the R input of the flip-flop 64 to switch it back to a logic zero output and stop the count. The counter now contains a binary count representing time. The digital-to-analog converter 50 converts this into an analog voltage representing azimuth. In this case, an inverter "1 divided by X" relationship is not desired, since azimuth (angle) is directly related to the time period between the pulse from a circuit of FIG. 2 driven from photoreceptor 62 and the pulse from another copy of the circuit of FIG. 2 driven from photoreceptor 22. The amplifier 54 can be connected to the multiplying D/A converter 50 in a slightly different way to generate the linear rather inverse relationship. The reset and store signals from the monostable multivibrators 46–49 cause the counters and latches to operate in a repeating mode.

Figure 4:
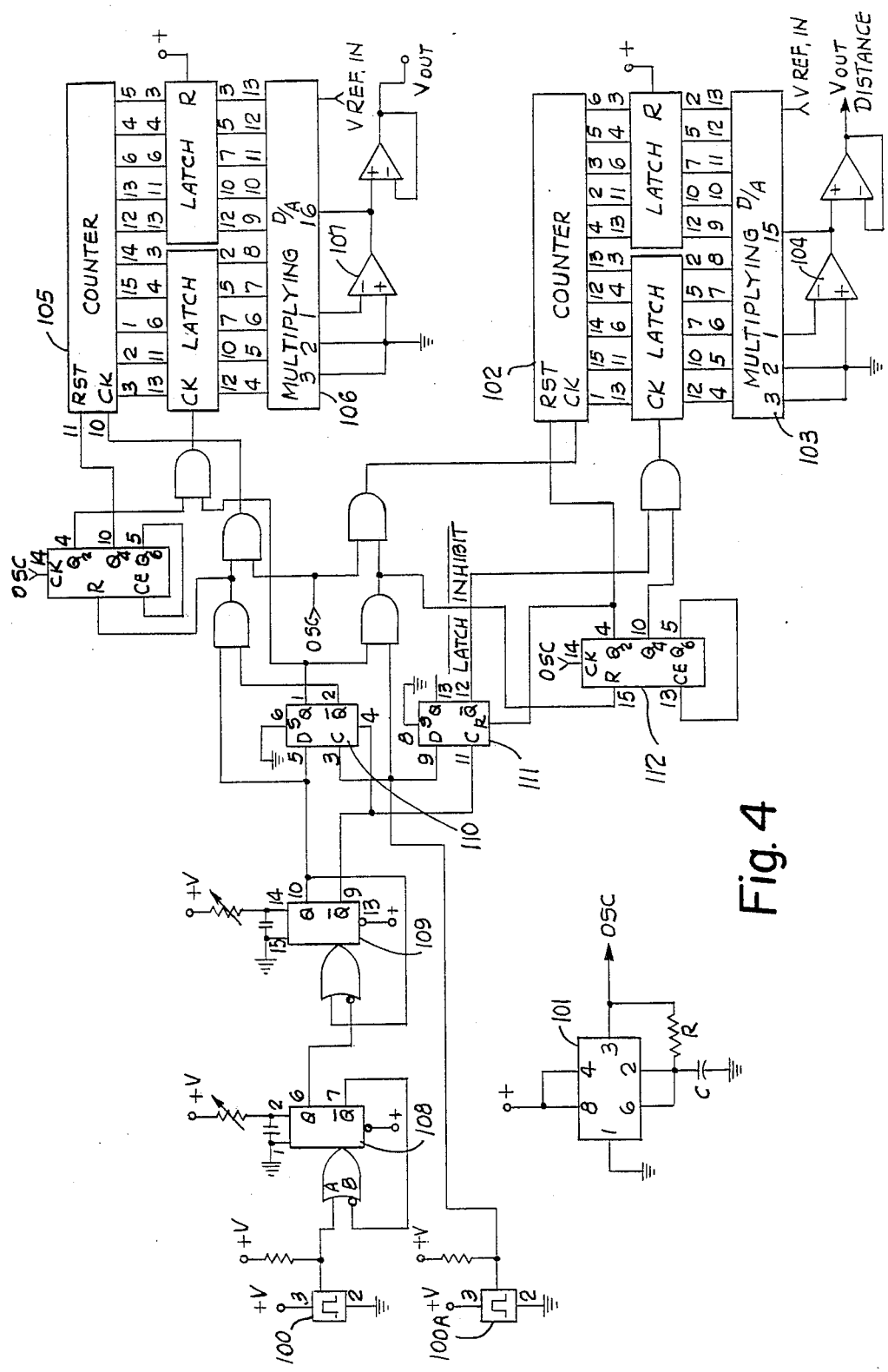
FIG. 4 is a schematic diagram of a combined range and azimuth circuit.
Figure 18:
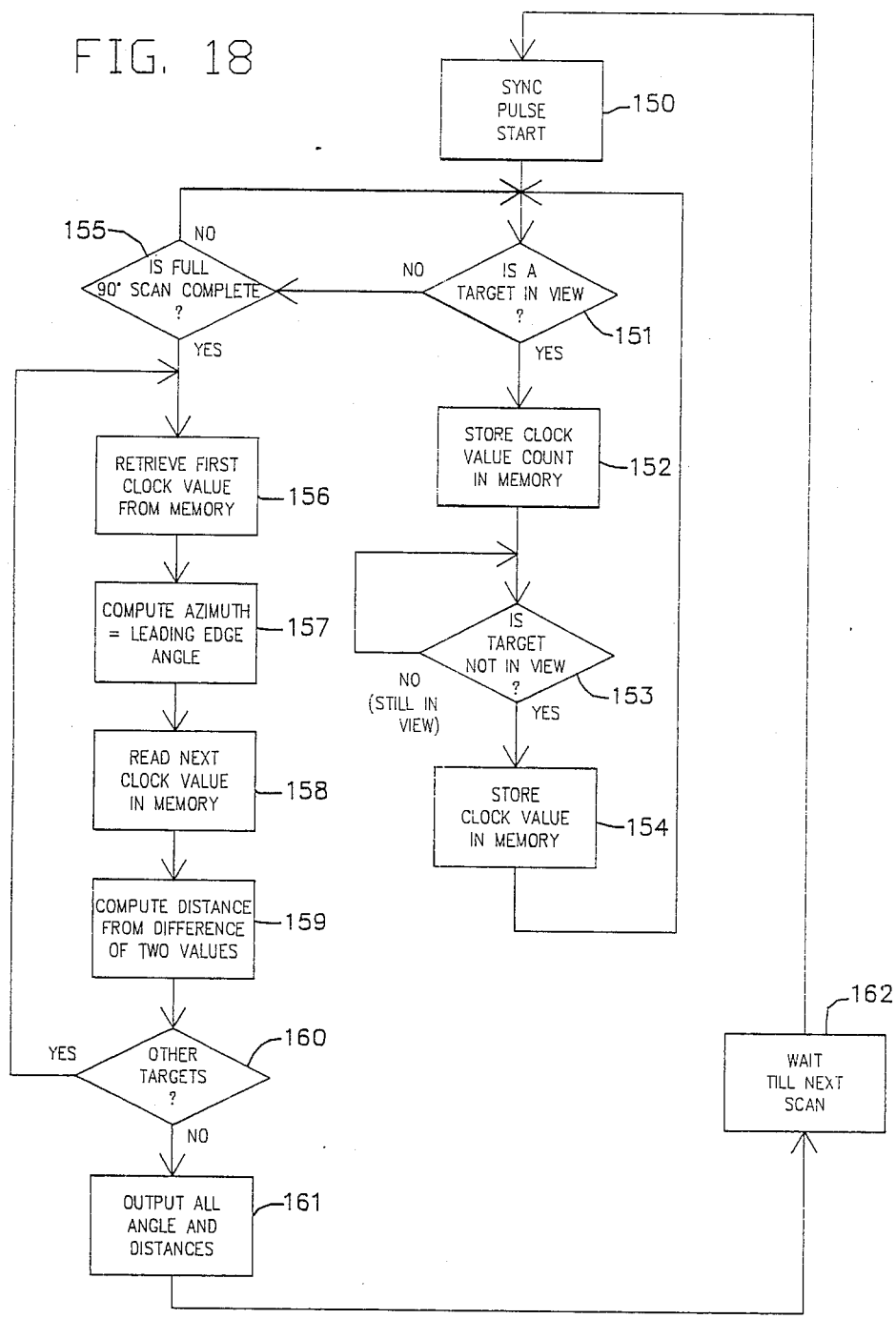
FIG. 18 shows a flow chart for software to perform the hardware operation of FIG. 4.

FIG. 4 shows the most recent analog design for combining the functions of range, width, and azimuth into one simultaneous system. The optical receivers, previously described in FIG. 2, and photoreceptors 22 and 62 are replaced with optoelectric integrated circuits 100 and 100A. The crystal oscillator 36 is replaced with an integrated circuit device 101. The range circuitry shown in FIG. 3 is again shown with counter 102 and D/A 103. The azimuth circuitry consists of counters 105 and D/A 106. Note that a simple connection choice to the D/A converter determines whether the circuit performs a "1 divided by X" or an "X" function, such as in the case for range the output of amplifier 104 is connected to pin 15 of D/A 103 to provide "1 divided by X" relationship, whereas the output of amplifier 107 is connected to pin 16 of D/A 106 to provide the "X" or non-inversion function. Dual use of one set of previously described monostable and flip-flop devices 46, 47, 48, 49, 64, now described as 108, 109, 110, 111, affords economy of design since they can drive both range and azimuth circuitry from one common set of pulses. FIG. 18 shows a flow chart for implementing the logic functions in software using a microprocessor-based control.

Figure 5:
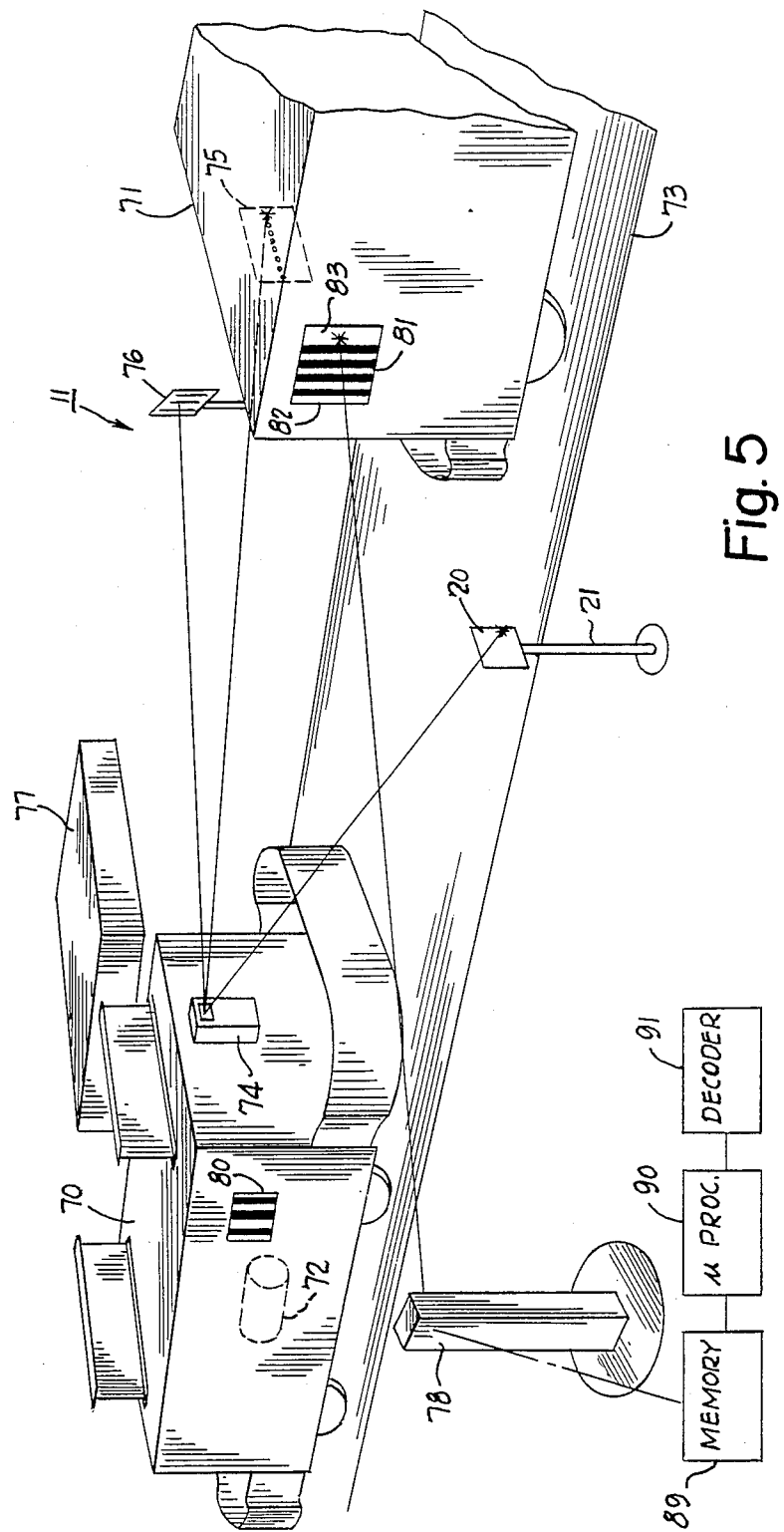
FIG. 5 is a perspective view of a target determining apparatus in accordance with the invention to determine distance, azimuth and binary code identification.

The apparatus 11 may be used not only to determine the azimuth, width and range of the target, but also to identify which of several targets is being scanned. FIG. 5 illustrates these three different capabilities of the apparatus 11. Automated guided vehicles 70 and 71 each have a motor 72 therein to provide locomotion of such vehicle. Such vehicles may move along a roadway 73 and be guided in operation by the apparatus 11. To this end, a scanner housing 74 may be mounted on the front of each vehicle to scan a fixed target 20 for azimuth position and distance; may scan a retroreflector target 75 on the rear of each vehicle in order to maintain a safe distance between successive vehicles; and may scan a binary coded fixed target 76 along the roadway 73 in order to determine information about the location of the vehicle relative to its position along the roadway 73. For example, there may be work stations 77 with the vehicles 70 and 71 transporting material to and from such work stations, and each work station could be identified by a different binary-coded target 76. Also, a scanner housing 78 may be mounted in a fixed location along the side of the roadway in order to scan binary-coded targets 80 and 81 on the vehicles 70 and 71, respectively. This could be used to identify each of several vehicles passing within range. The binary code on the targets 76, 80, and 81 may be a pure binary code, or may be a type of a bar code. In this embodiment, the binary-coded targets are ones which have retroreflective stripes at both the leading and trailing edges 82 and 83, respectively.

Figure 6:
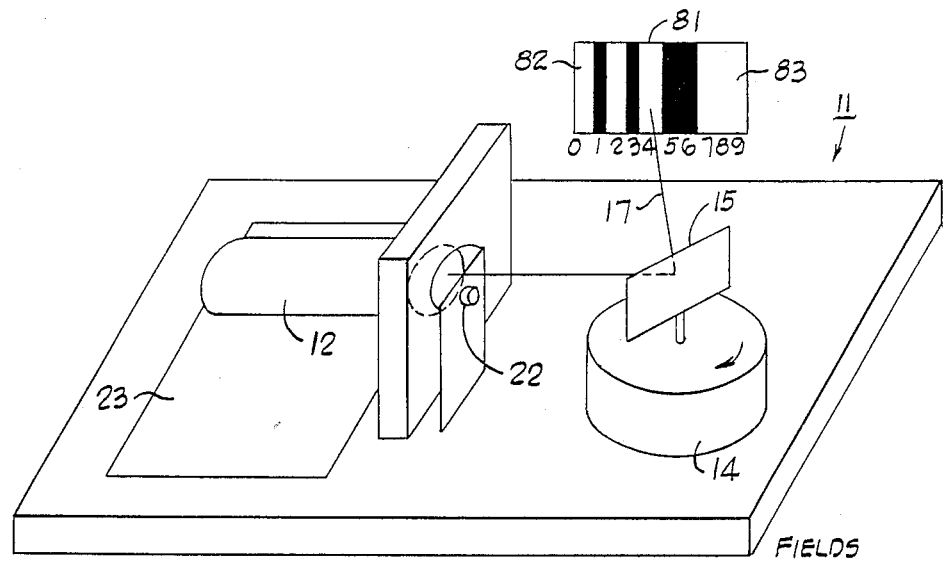
FIG. 6 is a diagrammatic view of the binary code identification system.
Figure 7:
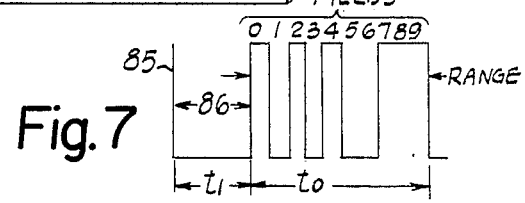
FIG. 7 is a diagram of the returned pulses.

FIG. 6 illustrates diagrammatically the target determining apparatus 11 wherein the binary coded target such as targets 76, 80, or 81 is identified. In FIG. 6, parts the same as those in FIG. 1 have been identified with the same reference numerals. The binary coded target 81 shown in FIG. 6 has a plurality of reflective and nonreflective strips transverse to the scanning path 17 to establish binary indicia on the target. The electronic circuit 23 connected to the photoreflector 22 is adapted to read the binary indicia on this target 81. This target is shown as having a reflective strip at both the leading edge 82 and the trailing edge 83. FIG. 7 illustrates the binary indicia present on the returned pulse from scanning the width of the target. The dark strips which are nonreflective can be dark strips covering the retroreflector, or merely some means to block retroreflector action such as complete absence of any retroreflector. FIG. 7 illustrates a return pulse 85 from the reference azimuth photoreceptor 62, and hence the distance in time between the reference pulse 85 and the leading edge of the target still obtains the azimuthal position of the target. The entire width of the target may still be used to determine range or distance; if the distance is known, the target width may be determined and the binary code may be utilized to provide information about the target.

In FIG. 6, the total width of the retroreflector 81 has been divided into n equal width fields and in this example has been divided into 10 such fields for an 8-bit binary code number. The fields zero and 9 in this embodiment are always reflective for a logic one condition. This allows the target reflector to be utilized for ranging as well. The 8-bit binary code gives 256 unique identification codes. If two or more black fields occur in succession, they are continuous. Also, reflective fields which occur in succession are continuous. It will be appreciated that as the target moves closer to or away from the scanning mirror, the time width of the coded pulses is likewise expanded or contracted. To decode the pattern, the pattern must be analyzed for relative values for each field within the combined ensemble. One way to do this is to digitally store the pattern in a memory device, either a shift register or a microprocessor memory. Next, the total time width is determined similar to that as done to determine range, and then the pulse structure is analyzed to determine the value, whether a logic one or a zero, at or near the center of each field. This function may be performed by a microprocessor or by hardware. FIG. 5 shows that the pulse pattern is transferred from the scanner housing 78 into a memory 89 and then operated on by a microprocessor 90 and fed to a decoder 91. These decoders are commercially available such as a bar decoder.

Figure 8:
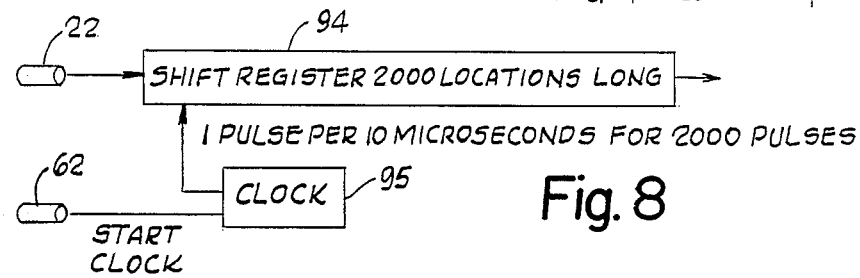
FIG. 8 shows a partial circuit for the binary code identification.
Figure 9:
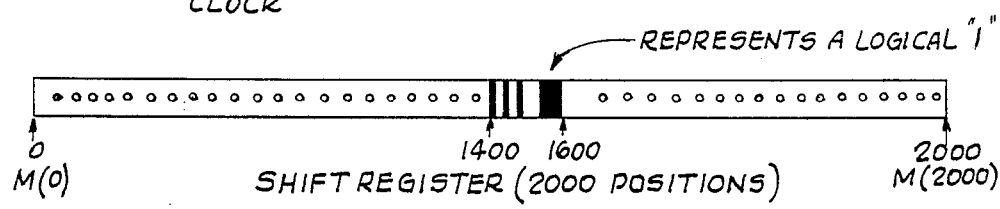
FIG. 9 is a diagrammatic showing of a shift register memory.
Figure 10:
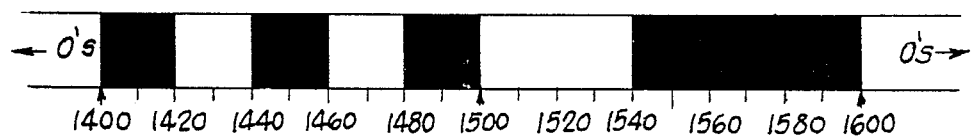
FIG. 10 is an enlarged view of the shift register memory.

The hardware version is perhaps easier to understand and FIGS. 8, 9, and 10 illustrate such an embodiment. In FIG. 8, assume that the total pulse width indicating range from the bar coded reflector is one millisecond at 10 feet and 10 milliseconds at one foot distance. In scanning the 10 fields within this total pulse, the precise width of the total pulse is not known because the range is still unknown. If one assumes for this example a maximum range of 10 feet, then each field is 0.1 milliseconds in scan width as a minimum.

Assume for discussion that the bar code is like that shown in FIGS. 6 and 7. The time period of the total reflector width, representing range, is $t_0$. The time period of the azimuth is $t_1$, and $f_n$ is the value of the field n, either a logic zero or one. Since $t_0$ and $t_1$ are variable and independent of $f_n$, these may be determined by the following method. FIG. 8 shows a storage device in the form of a shift register 94 or this may be a microprocessor memory. The shift register 94 samples the waveform in time and stores that value as either a logic one or a zero. Since in this example a minimum time $t_0$ is one millisecond, and with an assumed maximum desired error of 1%, the target is sampled and the value stored is X(t), with sampling at one millisecond divided by 100 increments, or at each 10 microseconds. Since X(t) can last up to 10 milliseconds plus any delay due to azimuth, at one foot distance of the reflector could be positioned at zero degrees to some other angle, and then some extra time must be accounted for. Let it be assumed that the total azimuth sweep is equivalent to two reflector widths at the one-foot range and the total period which must be sampled is 2×10 milliseconds=20 milliseconds; and this period is sampled for values of fields at each 10-microsecond increments. Therefore, the memory device must contain 20 milliseconds divided by 10 microseconds per point=2000 sample slots in the memory. The 2000 stage shift register is commercially available in integrated circuit form.

As shown in FIG. 7, the procedure starts when the azimuth reference signal is received from the photoreceptor 62 and establishes the reference pulse 85. The shift register stores the first sampling at the 10-microsecond point in memory position No. 1 and 10 microseconds later, a clock pulse causes the memory location No. 1 to be placed into memory location No. 2 while putting the new present value of X(t) into memory location No. 1. This continues, and in fact all memory locations are shifted in this matter. So if $n^t$ represents the time at the nth increment of 10 microseconds, then the shift register has 2000 memory locations, each having a memory location $X(n^t)$. If memory location M(n) represents the nth location, for all locations: $M(n)=X(n^t)$, where t=the time fixed at 10-microsecond intervals. The shift register, therefore, contains a sampled image of the returned pulse X(t) waveform, but in a digitized state. After 2000 steps, the clock 95 stops, and the stored data must be analyzed. The memory map of the shift register appears something like that shown in FIG. 9. The first thing determined is $t_0$. It is known that fields 0 and 9 are logic ones, and on FIG. 9 these are represented by the black lines. Starting from the left, the shift register contains all zeros until the reflector pattern is reached. Assume that the first logic one occurs at memory location 1400, i.e., M(1400)=1. Starting from the right, the shift register contains all logic zeros until the end of the bar code is reached. Assume that this is reached at position 1600, i.e., M(1600)=1. Therefore, memory positions 1400 through 1600 contain the entire reflector pulse pattern. Since each position represents a time period of 10 microseconds, the width $t_0$ can be calculated from $t_0=(1600-1400)\times10$ microseconds=two milliseconds. Therefore, since the range is determined by $t_0$, and 10 milliseconds gives one foot and one millisecond gives 10 feet, the range in this example is approximately 5.5 feet.

Note also that the azimuth can be calculated from the fact that between time 0 and the first sample of the waveform, M(1400), this is 1400×10 microseconds=14 milliseconds. Thus, if the angular velocity $\Omega$ is known, then the azimuth is: $\theta=(\Omega\times14$ milliseconds) degrees.

The binary code identification may be determined from the memory map of FIG. 9. This is shown expanded in FIG. 10. It is known that the 10 fields are equally divided into the entire segment of M(1400)-M(1600). Each bit field represents 1600−1400 divided by 10 fields=200 divided by 10=20 samples. Accordingly, field 0 is stored from M(1400)-M(1420). Successive fields are stored in each successive 20 samples. To find the identification number, the center or average of each field is examined and therefore the bit code or identification code is 01010011. The microprocessor 90 can readily sample each of these bit fields to identify this binary code or bar code. It will be appreciated that the memory map of FIG. 9 contains all the information for simultaneous determination of range, azimuth and target identification. Specific numbers used in this example are for illustration purposes only and the sampling rates, distances and scanning speed, etc. may be varied for particular requirements. The circuit components for one practical system combining FIGS. 2 and 3 circuit which has been constructed are set forth in the following table:

| Resistances | | | Amplifiers |
|---|---|---|---|
| R1 | 1.5K ohms | 30 | TL071 |
| R2 | 22K ohms | 54, 55 | TL071 |
| R3 | 820 ohms | | |
| R4 | 220 ohms | | |
| R5-R8 | 100K ohms | | Diodes |
| R9 | 6.8 M ohms | D1 | IN914 |
| R10 | 10K ohms | | |
| Capacitors | | | Gates |
| C1, C2 | 10 pf | 37 | 4001 |
| Transistors | | | Integrated Circuits |
| 22, 62 | OP805 | 34, 40 | 4518B |
| 28 | 2N4250 | 41 | 4040B |
| 29 | 2N5088 | 43, 44 | 40174 |
| | | 50 | AD7533KN |
| | | 46-49 | 4538 |
| | | 64 | 4027B |
| | | 90 | INTEL 8741 |
| | | 91 | Welch Allyn LTS-3 |
| | | 94 | AM2533 |

The most recent analog implementation of the system, shown in FIG. 4, has been constructed using components set forth in the following table.

| Integrated Circuits | |
|---|---|
| 100, 100A | ULN3330 |
| 102, 105 | 4040 |
| 103, 106 | AD7533KN |
| 104, 107 | TL071 |
| 108, 109 | 4538 |
| 110, 111 | 4013 |
| 112 | 4017 |

Figure 11:
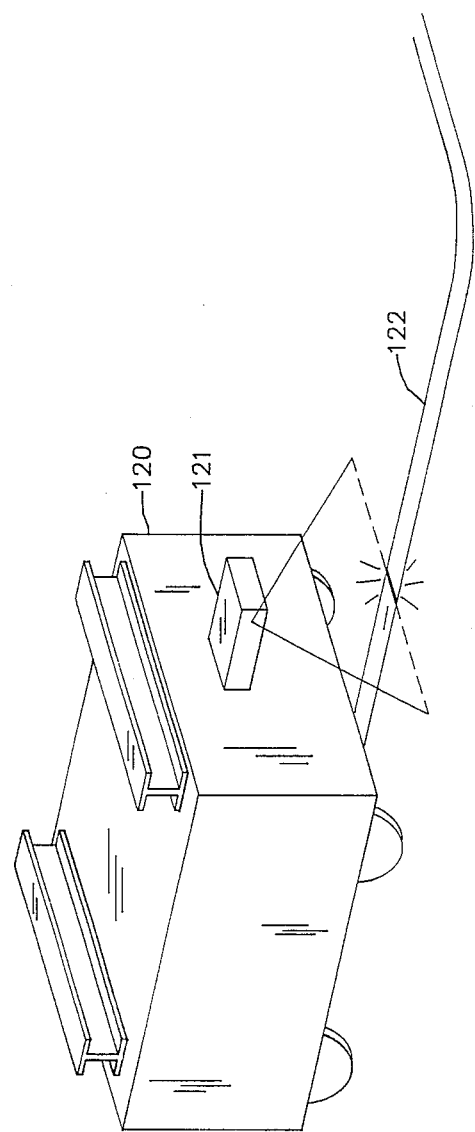
FIG. 11 is a variation of FIG. 5 where azimuth measurement determines direction and distance measurement determines height above the floor.

FIG. 11 shows an application for use of this apparatus to guide automatic vehicles, similar to the configuration of FIG. 5, but in a vertical orientation. In this case, vehicle 120 has mounted to it the said scanning apparatus 121 mounted so that it scans towards the floor. Attached to the floor is a continuous strip of retroreflective tape 122 which is used to guide the steering direction of the vehicle. The apparatus 121 scans downward at the floor, and the retroreflective tape is detected at some specific point in the scan as determined by the azimuth or angle measurement as described above. As the vehicle moves, the position of the tape is detected as an angle readout, and the information is sent to an appropriate guidance controller, so as to track the tape. A possible algorithm would be to adjust the steering of the vehicle such that the detected angle of the tape is always at a point halfway between the two scan extremes, i.e., at 0 degrees from the normal to the front of the apparatus. Simultaneously, the vehicle height is measured using the incorporated feature of the measurement of distance to a retroreflector target. This important, since many vehicles need to position the vertical height of their load to accommodate transfer to a waiting station. The advantage here is that no additional hardware is needed to accomplish this second task.

Figures 12, 13:
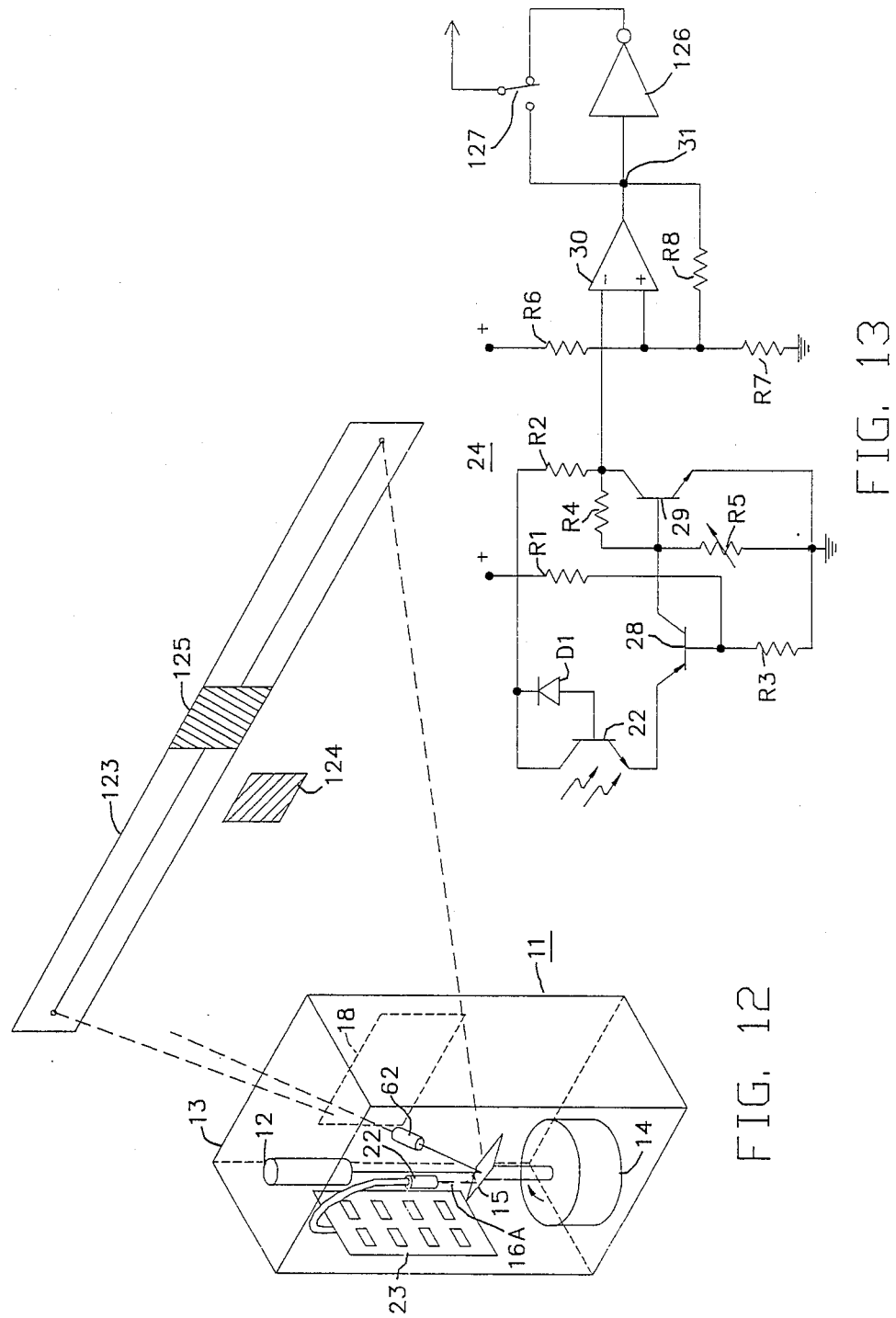
FIG. 12 shows the inverse operation of determining the distance and location of a shadow object.
FIG. 13 is a schematic diagram of the inverted circuit of FIG. 3.

FIG. 12 shows that the complementary operation for detecting distance and angle to a fixed width retroreflective target is possible. In this case, a fixed width non-reflective target is scanned and processed similar to that of the reflective target. A long retroreflective strip 123, longer than full scan capability of the apparatus, is continually scanned with the narrow light beam from the apparatus 11. If a fixed width opaque target 124, similar to target 20A of FIG. 1, is placed in the field of scan, it can be located with regard to angle and distance if the inverse of reflection is used as the target signal. A shadow 125 is developed on retroreflector 123 where no light is returned to the apparatus 11. This is analogous to reflecting light only from the target, but here the absence of light is used as the signal rather than the presence of light. This configuration can be easily accommodated with all previously described circuit embodiments if one simply inverts the logic signal coming out of the optical receiver circuit given as in FIG. 2. However, here in FIG. 13 a digital logic inverter 126 is added to produce the complementary signal, i.e., a logic level "1" when there is no light due to a shadow due to a scan from the leading to the trailing edge across the target. This is with an inverting switch 127 in the position shown. When thrown to the alternate position, the circuit is usable for retroreflective targets, as in FIG. 2. Of course, this logic inversion can also be accomplished in software.

Figure 14:
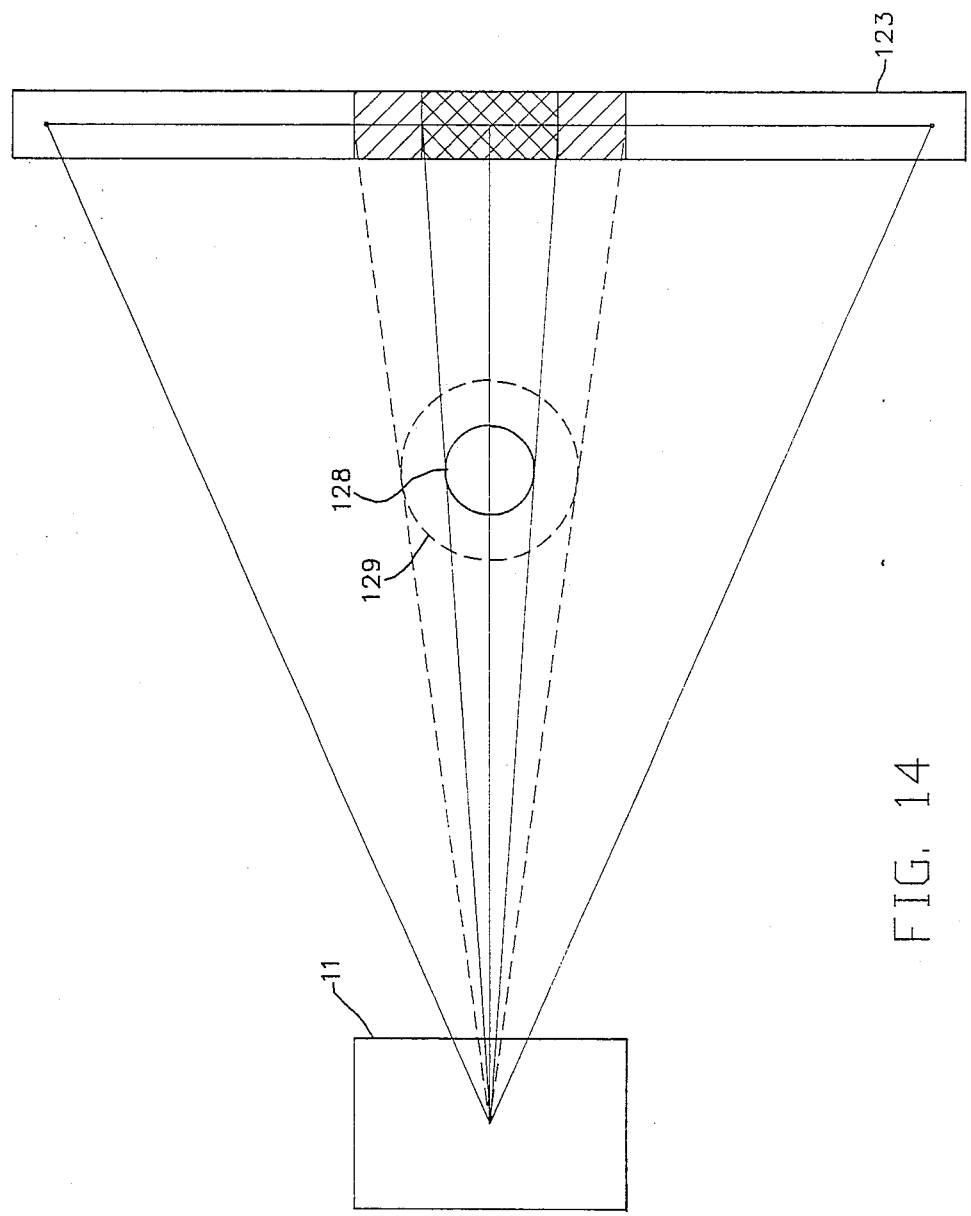
FIG. 14 shows a gauging application as a direct consequence of the inverse operation.

FIG. 14 follows the inverse operation of the shadow mode given in FIG. 13 for a particular application of measuring the diameter of an object. If an object whose width is a variable quantity is placed at a fixed distance from the apparatus 13, then the variation of the diameter of the object manifests itself in a variation in the scanning time of the shadow. Object 128 projects a smaller shadow than an object 129, and therefore can be measured by the time of non-reflective scan. Fixed-distance targets exhibit the mathematical behavior of relating their diameter with a direct relationship with the time to scan across the target. A trigonometric compensation for the tangent of the angle is required, and may be built into the software, when accurate measurements are needed and the target produces a shadow greater than 20 degrees of view.

Figure 15:
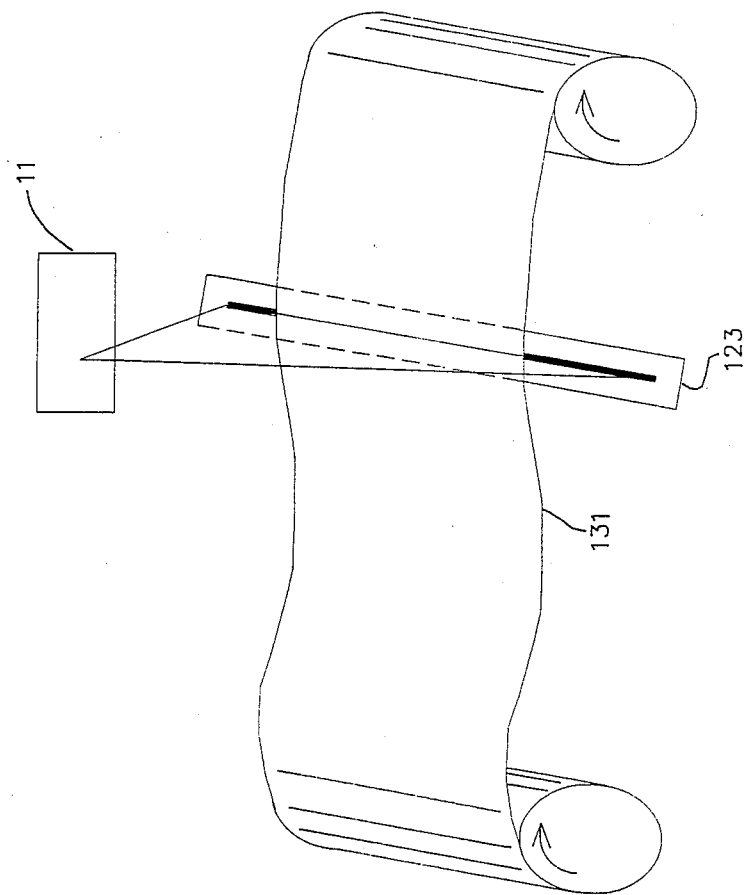
FIG. 15 shows a web scanning width application using the shadow of the web material at a known distance.

FIG. 15 demonstrates another application of the use of the inverse target mode, that of scanning a web of material for dimensional measurements. The scanning apparatus 11 is looking down across a moving sheet of material 131. Beneath this material is a retroreflector strip 123 which exceeds the width of the material and yet includes the beginning and end of the scan. Since the material sheet 131 is placed at a fixed distance from the scanning apparatus 11, then any variation in width of the web is detected by the scanner per the procedure described in FIG. 18 below.

Figure 16:
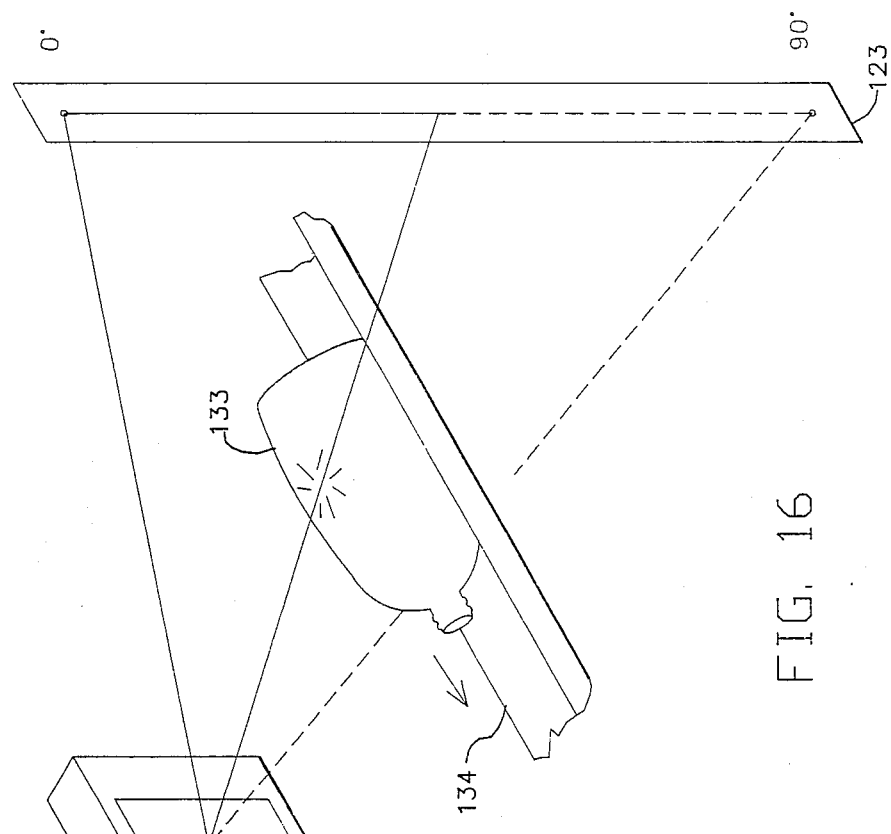
FIG. 16 shows a continuous profiling operation based on a moving target, providing a continuously variable shadow width which represents target size.

FIG. 16 demonstrates a further variation of fixed distance scanning, that of profile scanning a moving object. Notice that as some object, like container 133, passes before the sensor, e.g., on a conveyor 134, it is being gauged, since the inverse light mode is being used. The angle measurement is being used to determine the position of the leading edge of the container target. Since light is reflected continuously from the beginning of the scan until the point just before the container prevents light from impinging the strip retroreflector 123, the inverse target mode is interpreted that no target has been detected. When the light beam finally is interrupted by the object, then no light impinges the retroreflector, and no light returns to the scanner 11. The inverse target mode determines this to be the detection of an object. Therefore, the angle position is determined by the previously discussed procedure for the scanning apparatus. A sequence of such readings as the object passes the scanner constitutes a set of data values describing the object's profile. Again, this is a consequence of a fixed distance target.

Figure 16A:
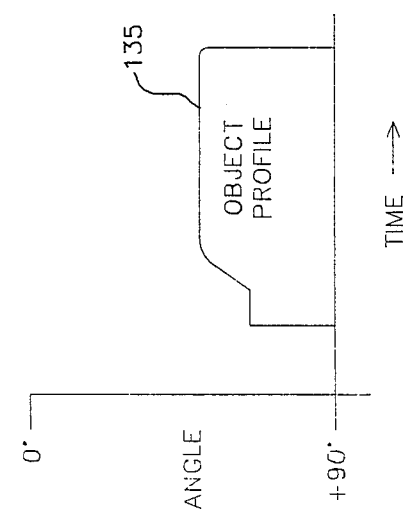
FIG. 16A shows a graph of the object profile.

FIG. 16A illustrates how the object profile 135 may be represented as a graph of angle versus time from the data from consecutive scans across the target as it moves on the conveyor.

Figure 17:
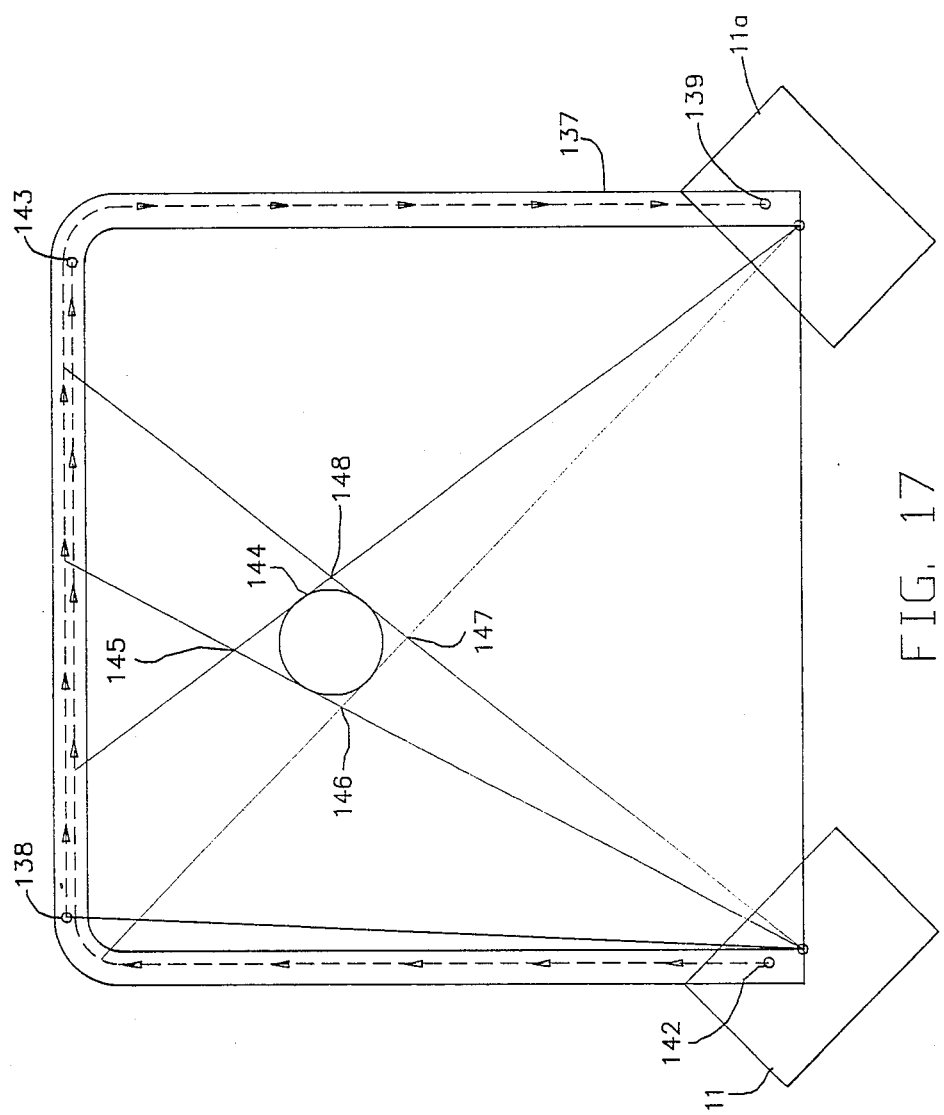
FIG. 17 shows a perimeter and area object detection system.

FIG. 17 extends the ideas presented in FIGS. 12-16 to the general form of target determination and object detection using the inverse light mode. A strip retroreflector 137 is positioned in some curvilinear path in one location, here being a continuous strip of three sides of a rectangle. The scanner 11 is located at another location in one corner such that its full scan angle from beginning of scan at point 138 to end of scan at point 139, here nominally 90 degrees, covers the entire field defined by the strip retroreflector and the scanner.

A second scanner 11A may be positioned in a third location so as to scan the same general area as reflected to it by retroreflector strip 137. The 90-degree scan beginning would be at point 142 and end at point 143. Effectively, any object 144 which is positioned in this area can be detected. It can be measured for distance through the normal procedures defined above if its diameter is known. Also, if the object is located at a fixed radial distance from the scanner 11 or 11A, then its diameter can be measured. The target azimuth from a reference, e.g., at the beginning of scan, may also be determined for each apparatus 11 and 11A. Since each scanner 11 and 11A is viewing the object from a different perspective, the two separate azimuth values can give an approximate location position of the target here shown at point 145. Furthermore, if both azimuth and target width information described above derived from each scanner is processed in any general purpose computer, then a two-dimensional measurement of target size and target position can be determined. In FIG. 17, this calculation would determine the exact locations of points 145, 146, 147, and 148. These points describe a box which surrounds target 144. Assuming that there is enough light to reach the furthest corner of the strip retroreflector, then the particular path of the retroreflector strip has no consequence to the measurement performance. This combines the features of object presence detection with either object location or object diameter measurement.

The algorithms for determining a target position and distance can be processed in software with the aid of a microprocessor embedded in the apparatus, as a replacement for some of the hardware described above in FIGS. 3 and 4. FIG. 18 gives a flow chart of the logic to perform this function. Basically, when the scanning motor positions the scanning beam at the starting position of the scan shown by block 150, the microprocessor tries to detect whether a target has been detected shown by block 151. When the leading edge of a target is sensed, by either the return of reflected light from a retroreflector target or the absence of light produced by a shadow target in the inverse light mode, the microprocessor immediately stores the internal clock value, using block 152, which represents the angular position of the scanning beam at that instant, into a memory location. The microprocessor next goes by block 153 immediately and waits to detect the end position of the target, which causes the target to not be in view. When this happens, the microprocessor immediately stores the clock value, using logic block 154, into the next memory location representing the angle at the trailing edge of the target. After this, the microprocessor starts looking for other targets by going back to block 151, and stores additional pairs of angular data values into memory if indeed other targets are detected. When the active scanning angular position reaches the end of the scan as detected by logic block 155, in this case after 90 degrees of scan, the microprocessor then proceeds to process the stored information to determine azimuth and distance for each target detected. Process block 156 retrieves the first stored angular value and computes azimuth directly in block 157, since azimuth is proportional to this angle datum. The second data value is retrieved by block 158, representing the angle for the trailing edge of the target. The first angle value is subtracted from this second value, and the difference represents time to scan across the target, since the actual time to scan is proportional to this difference. Now distance can be computed in block 159 with the 1/X algorithm either in software, and thus sending direct measure of distance, or by hardware providing this 1/X function in an analog voltage form. Block 161 will output the appropriate information for each target detected, since block 160 will repeat this function for each target detected. Block 162 returns the process to the starting position. The output functions can also be provided for in a digital serial form, such as usng a RS-232 specification. The methods for accomplishing this communication are well known by the industry.

Once the fundamental edge angular values are stored in memory, many different forms of target analysis are possible. FIG. 18 shows how to determine the angle and distance to the target by processing the leading and trailing edge angles of the targets. Other forms of analysis are possible.

Figure 19:
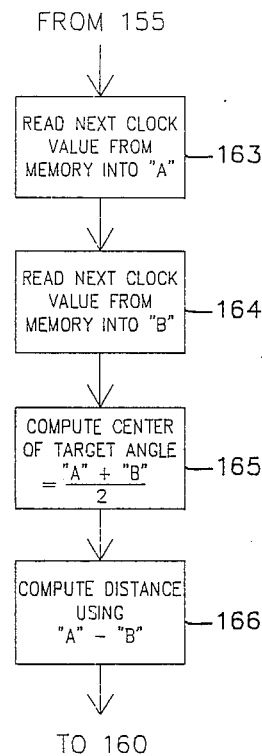
FIG. 19 shows a flow chart for center of target calculation.

FIG. 19 shows an alternative for determining angular direction to the target. Here, instead of associating the leading edge of the target with the azimuth of the target, the azimuth is computed as the center of the target. Block 163 shows the leading edge clock value is read from memory and entered into a memory "A". Block 164 reads from memory the trailing edge clock value and enters it in memory "B". Block 165 takes the average value of the leading and trailing edges of the target, and is a substitute for block 157. Other functions of target analysis are possible, since only a software substitution for block 165 and/or block 166 need be made, with block 166 a substitute for block 159. Other functions include (1) ignoring the target if its distance is too far, such as "A"-"B" is too small, or (2) only processing the first, last, or nth angular data pair for multiple targets, or (3) processing a variable distance bar-coded target in software by performing the hardware solution of target identification given by FIGS. 6 through 10, using equivalent software operations. Indeed, once the fundamental edge values of the targets are available in memory, then the capability of expanding the target determining characteristics may be found by software descriptions of the algorithms.

FIG. 20 gives examples of various target formats which can work with the apparatus. FIG. 20A shows the standard fixed with retroreflector target 170 for basic target aximuth and distance determination.

Figure 20D:
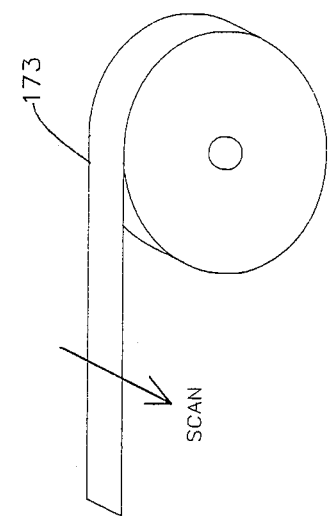
FIGS. 20A-20D show variations of target reflectors and target shadows for use in complementary application.
Figure 20B:
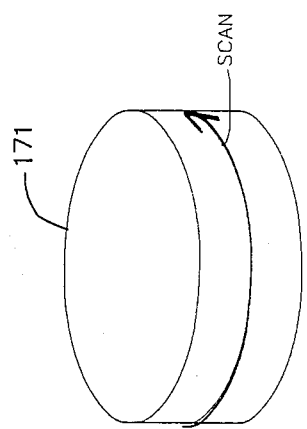
Figure 20A:
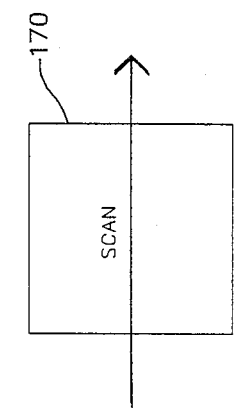

The retroreflector 171 shown in FIG. 20B has the characteristic of having a circular cross section in the plane of the scan, namely being a cylinder around which a retroreflector is banded in a continuous 360-degree strip. This reflector 171 can be used to eliminate directional characteristics of the flat target of FIG. 20A. The center-of-target angle algorithm discussed with relation to FIG. 19 would be most appropriate for automatic guided vehicle applications shown in FIG. 5. Target 20 in FIG. 5 can be replaced with this configuration of FIG. 20B for some applications.

Figure 20C:
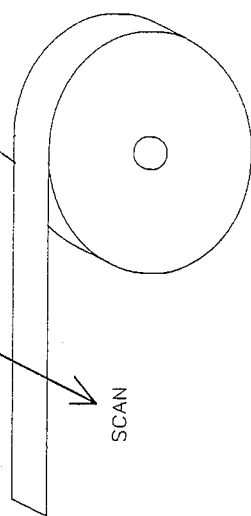

The target 172 in FIG. 20C shows a variation of a circular cross section retroreflector target, in the shape of a cone. For fixed distance applications, the vertical motion of this target will be detected as an angular width change, and consequently height can be determined.

Finally, a tape strip 173 of retroreflector material, as shown in FIG. 20D, can be used with the application in FIG. 11. Its width will initiate height measurements, while its physical placement on the floor can cause a directing function for vehicle navigation. Other forms of these retroreflector targets can be determined with regard to specific applications.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of circuits and construction and the combination and arrangement of parts may be resorted to without departing from the spirit and the scope of the invention as hereinafter claimed.

What is claimed is:

1. A target determining apparatus comprising in combination;

a light source at a first location; means at said first location for scanning a beam from said light source along a scanning path at a known rate of angular velocity;

a retroreflector and a non-retroreflector adapted to be at a second location in said scanning path to reflect said light beam from said retroreflector back toward said scanning means;

one of said retroreflector and said nonretroreflector being a target having leading and trailing edges;

said light source beam being narrow in the direction of said scanning path and narrower than the scanned width of said target;

one of the target scan width and target distance being known;

a photoreceptor positioned at said first location to be responsive to any reflected light beam from said retroreflector; and target determining means to determine the other of said target scan width and distance with distance related inversely, and the target scan width related directly, to the length of time between the light beam scan from the target leading edge across the target to the trailing edge.

2. A target determining apparatus as set forth in claim 1, wherein said light source beam is a columnated laser beam.

3. A target determining apparatus as set forth in claim 1, including means to provide relative movement between said light source and said target.

4. A target determining apparatus as set forth in claim 3, wherein said relative movement is provided by means to move said light source.

5. A target determining apparatus as set forth in claim 3, wherein said relative movement is provided by means to move said target.

6. A target determining apparatus as set forth in claim 1, wherein said target determining means includes means to establish pulses at a constant frequency during the time of scan of the target and means to count the pulses to determine the angular scan width of the target.

7. A target determining apparatus as set forth in claim 6, wherein said pulse establishing means includes a fixed frequency oscillator.

8. A target determining apparatus as set forth in claim 1, wherein said target determining means includes a crystal-controlled oscillator; and
   an AND circuit having one input from said oscillator and another from said photoreceptor to have an output of a series of pulses of the oscillator frequency with the number of such pulses dependent upon the effective width of the target.

9. A target determining apparatus as set forth in claim 8, including a counter connected to count the number of pulses; and
   a digital-to-analog converter to convert the digital count to a proportional analog voltage which is inversely related to the distance from the scanning means to said target.

10. A target determining apparatus as set forth in claim 1, wherein said target determining means includes means to establish a reference point at a known azimuthal position relative to said scanning means; and
    means to determine the angular azimuthal position of the target relative to the reference point in accordance with the length of time of scan between the reference point and the target.

11. A target determining apparatus as set forth in claim 10, including a binary code on said retroreflector target; and
    means connected to said photoreceptor to read said binary code.

12. A target determining apparatus as set forth in claim 1, including a binary code on said retroreflector target; and
    means connected to said photoreceptor to read said binary code.

13. A target determining apparatus comprising in combination:
    a light source;
    means for scanning a base from said light source along a scanned path;
    a target mounted on an object adapted to be in said scanning path to reflect said light beam back toward said scanning means;
    a photoreceptor positioned to be responsive to any reflected light beam from said target reflector;
    a plurality of retroreflective and nonreflective strips transverse to said scanning path constituting said target to establish binary indicia on said target;
    means connected to said photoreceptor to read the binary indicia on said target; and
    means to compensate for differing effective scan times of said strip in accordance with variations in distance to said target.

14. A target determining apparatus as set forth in claim 13, wherein said compensation means includes a storage memory connected to said photoreceptor to receive and store the binary information from the target retroreflector.

15. A target determining apparatus as set forth in claim 14, wherein said storage memory is a shift register.

16. A target determining apparatus as set forth in claim 14, wherein said indicia reading means includes means to sample the binary information in said storage memory at a high repetition rate relative to the time width of the binary information in the storage memory.

17. A target determining apparatus as set forth in claim 1, wherein said retroreflector is the target.

18. A target determining apparatus as set forth in claim 3, wherein said target is an elongated retroreflector adapted to guide movement of said light source therealong.

19. A target determining apparatus as set forth in claim 18, wherein said determining means determines the distance to the target.

20. A target determining apparatus as set forth in claim 1, wherein said non-retroreflector is the target.

21. A target determining apparatus as set forth in claim 20, wherein said determining means determines the target distance.

22. A target determining apparatus as set forth in claim 20, wherein said determining means determines the target scan width.

23. A target determining apparatus as set forth in claim 20, wherein said determining means determines the profile of the target.

24. A target determining apparatus as set forth in claim 20, wherein said determining means determines the presence or absence of a target in the scanning path.

25. A target determining apparatus as set forth in claim 1, wherein said target determining means determines the center of the target.

26. A target determining apparatus as set forth in claim 1, wherein said target is a retroreflector having a substantially circular cross section in the scanning path.

27. A target determining apparatus comprising in combination:
    a light source at a first location; means at said first location for scanning a beam from said light source along a scanning path at a known rate of angular velocity;
    a retroreflector and a non-retroreflector adapted to be at a second location in said scanning path to reflect said light beam from said retroreflector back toward said scanning means;
    said non-retroreflector being a target having leading and trailing edges;
    said light source beam being narrow in the direction of said scanning path and narrower than the scanned width of said target;
    a photoreceptor positioned at said first location to be responsive to any reflected light beam from said retroreflector; and
    target determining means to determine the presence of a target in the scan of said light beam including means to measure the angle between the light beam scan from the target leading edge across the target to the trailing edge.

28. A target determining apparatus as set forth in claim 27, including a second light beam at a third location scanning at least part of said scanning path at a known rate of angular velocity; and a second photoreceptor positioned at said third location to be responsive to any reflected light beam from said retroreflector.

29. A target determining apparatus as set forth in claim 28, wherein said target determining means includes means to measure the angle between the second light beam scan from the target leading edge across the target to the trailing edge.

30. A target determining apparatus as set forth in claim 29, including a reference point at a known azimuthal position relative to said scanning means; and means to determine the angular azimuthal position of the target relative to the reference point in accordance with the length of time of each of the two scans from the reference point to the target.

* * * * *

UNITED STATES PATENT AND TRADEMARK OFFICE
CERTIFICATE OF CORRECTION

PATENT NO. : 4,788,441
DATED : November 29, 1988
INVENTOR(S) : Edward L. Laskowski It is certified that error appears in the above-identified patent and that said Letters Patent is hereby corrected as shown below:

Col. 5, line 12 "This" should be --These--.

Col. 6, line 30 "is perform" should be --is to perform--.

Col. 7, line 42 "azimuth" should be --azimuthal--.

Col. 10, last line "is" should be inserted after --This--.

Col. 11, line 63 "sensor" should be --scanner--.

Col. 13, line 36 "usng a" should be --using an--.

Col. 15, line 57 "base" should be --beam--.

Col. 15, line 58 "scanned" should be --scanning--.

Signed and Sealed this

Twenty-eighth Day of March, 1989

Attest:

DONALD J. QUIGG

*Attesting Officer*  *Commissioner of Patents and Trademarks*